US005610503A

United States Patent [19]

Fogg et al.

[11] Patent Number: 5,610,503
[45] Date of Patent: Mar. 11, 1997

[54] LOW VOLTAGE DC-TO-DC POWER CONVERTER INTEGRATED CIRCUIT AND RELATED METHODS

[75] Inventors: John K. Fogg, Durham, N.C.; Wayne Utter; George Dohanich, both of Endicott, N.Y.

[73] Assignee: Celestica, Inc., Ontario, Canada

[21] Appl. No.: 438,636

[22] Filed: May 10, 1995

[51] Int. Cl.[6] ............................................. G05F 1/40
[52] U.S. Cl. ..................... 323/283; 327/537; 323/287; 323/284
[58] Field of Search .................. 363/49, 147; 327/537; 323/271, 285, 283, 901, 907, 287, 284

[56] References Cited

U.S. PATENT DOCUMENTS

| | | | |
|---|---|---|---|
| 4,395,675 | 7/1983 | Toumani | 323/271 |
| 4,538,073 | 8/1985 | Freige et al. | 307/33 |
| 4,823,070 | 4/1989 | Nelson | 323/285 |
| 4,887,199 | 12/1989 | Whittle | 363/49 |
| 4,974,141 | 11/1990 | Severinsky et al. | 363/81 |
| 4,975,820 | 12/1990 | Szepesi | 363/21 |
| 5,001,620 | 3/1991 | Smith | 363/89 |
| 5,068,775 | 11/1991 | Borgatti et al. | 363/15 |
| 5,352,969 | 10/1994 | Gilmore et al. | 320/39 |
| 5,498,995 | 3/1996 | Szepesi et al. | 327/538 |

Primary Examiner—Peter S. Wong
Assistant Examiner—Shawn Riley
Attorney, Agent, or Firm—Allen, Dyer, Doppelt, Milbrath & Gilchrist, P.A.

[57] ABSTRACT

A dc-to-dc converter circuit for generating an output voltage from a source voltage includes a plurality of first metal oxide semiconductor field effect transistors (MOSFETs) connected in parallel and collectively defining a gate, a source and a drain. A driver circuit preferably includes a bipolar transistor connected to the gate for turning on the first MOSFETs. A second MOSFET is preferably connected to the gate for turning off the plurality of first MOSFETs. The dc-to-dc converter also preferably includes a clamp circuit connected to the plurality of first MOSFETs across the drain and source thereof. Protection, soft-start and status features are also preferably incorporated into the dc-to-dc converter. A voltage divider is connected to a reference voltage for dividing a first reference voltage to thereby generate a second reference voltage less than a desired output voltage. An error amplifier is connected to the voltage divider for generating an error signal based upon a difference between the second reference voltage and an actual output voltage. External control of the output voltage may be achieved by overdriving a node of the voltage divider, such as to facilitate enhanced operation of a microprocessor or memory device having an preferred operating voltage. A digital-to-analog converter supplies the analog error driving signal from the microprocessor or memory device. Method aspects of the invention are also disclosed.

34 Claims, 3 Drawing Sheets

LOW VOLTAGE DC-TO-DC POWER CONVERTER INTEGRATED CIRCUIT AND RELATED METHODS

FIELD OF THE INVENTION

The present invention relates to the field of electronics, and, more particularly, to a dc-to-dc power converter, such as for powering electronic devices.

BACKGROUND OF THE INVENTION

Dc-to-dc power converters are widely used to supply power to electronic devices, such as computers, printers, etc. Such dc-to-dc converters come in a variety of configurations for producing a desired output voltage from a source voltage. For example, a buck or step down power converter produces an output voltage that is less than the source voltage. A typical step down converter has high conversion efficiency, is relatively simple, and requires no output transformer. In addition, a small output filter may be used and the output voltage has relatively low ripple. A typical step down converter is relatively small in size and may therefore be used in embedded systems, such as personal computers.

A typical dc-to-dc step down converter in integrated circuit form is made by Harris Corporation, the assignee of the present invention, under the designation 45V/14A BUCK Power IC. The 45 V/14A BUCK Power IC produces a voltage of 5.1 to 12 volts.

The 45 V/14A BUCK Power IC includes a plurality of double-diffused vertical metal oxide semiconductor (DMOS) field effect transistors (FETs) connected in parallel. The DMOS transistors are operated via a gate driver, which, in turn, is connected to a pulse width modulation (PWM) circuit. The gate driver of the 45 V/14A BUCK Power IC includes a pair of bipolar transistors connected in a conventional totem pole configuration. One bipolar transistor pulls up the gate voltage of the DMOS transistors to thereby turn on the DMOS transistors. Similarly, the other bipolar transistor pulls down the gate voltage to thereby turn off the DMOS transistors to thereby regulate the output voltage.

As is typical, the 45 V/14A BUCK Power IC also includes circuitry for implementing soft-start features, as well as protection and status features. The soft-start works in conjunction with an external capacitor and the reference voltage/error amplifier to allow the output voltage to slowly ramp to its desired value during start-up. The protection circuitry includes over-voltage, under-voltage, over-current, and over-temperature protection.

The pulse width modulation (PWM) circuit of a typical dc-to-dc converter, such as the 45V/14A BUCK Power IC, accepts a clock signal as an input along with a signal from an error amplifier. The error amplifier, in turn, is connected to the output voltage and an internal precision voltage reference having a predetermined output voltage less than the output voltage. For example, for the 45 V/14A BUCK Power IC, the precision reference voltage is 5.1 volts. Accordingly, the output voltage of the power IC cannot be less than 5.1 volts.

There are many commercial applications where a relatively low dc voltage in the range of 2 to 5 volts is desired, such as for powering a microprocessor. Unfortunately, a step down power converter including DMOS transistors may not be suitable for such a low voltage application. For example, the DMOS transistors of the 45 V/14A BUCK Power IC have a turn on resistance which is relatively high (about 75 mΩ) and which may adversely effect the available output current and efficiency for such a low voltage application. In addition, since many thousands of DMOS transistors are provided on the integrated circuit die, reducing individual transistor cell size is also important.

A new generation of microprocessors, for example, may be screened device-by-device to obtain optimum performance and speed based on operating voltage. Unfortunately, most common power supplies are not precisely and readily reconfigurable to select a desired output voltage.

SUMMARY OF THE INVENTION

In view of the foregoing background, it is therefore an object of the present invention to provide an integrated circuit step down dc-to-dc power converter and related method for low voltage applications and providing accurate voltage regulation and high efficiency.

It is another object of the present invention to provide an integrated circuit step down dc-to-dc power converter and related method facilitating selection of a desired output voltage, such as to enhance performance of a microprocessor having an enhanced operating voltage.

These and other objects, features, and advantages of the present invention are provided by dc-to-dc converter comprising output means on a substrate for generating an output voltage from a source voltage, wherein the output means includes a plurality of first metal oxide semiconductor field effect transistors (MOSFETs) connected in parallel and collectively defining a gate, a source and a drain. In particular, each of the plurality of first MOSFETs preferably comprises an n-channel enhancement-type MOSFET. The n-channel enhancement-type NMOS transistors have a relatively low turn on resistance and have a relatively small cell size thereby reducing the required area on the substrate.

Driver means is included on the substrate and connected between control means and the output means. The driver means preferably includes a bipolar transistor connected to the gate for turning on the plurality of first MOSFETs. A second MOSFET is preferably connected to the gate for turning off the plurality of first MOSFETs. The output of the gate driver preferably employs a bipolar npn transistor for the output pull-up device and an n-channel MOSFET for the output pull-down device. In general, the bipolar output is capable of much higher current density which minimizes the required die area. However, the use of a bipolar pull-down transistor is not compatible with driving the plurality of first MOSFETs for all conditions.

The dc-to-dc converter also preferably includes clamp means connected to the plurality of first MOSFETs across the drain and source thereof for clamping a drain to source voltage, such as during a transient voltage condition. Protection, soft-start, and status features are also preferably incorporated into the dc-to-dc converter.

The control means further preferably comprises reference voltage means for generating a first reference voltage greater than the output voltage. Voltage divider means is thus preferably connected to the reference voltage means for dividing the first reference voltage to generate a second reference voltage lower than a desired output voltage. Error determining means is preferably connected to the voltage divider means for generating an error signal based upon a difference between the second reference voltage and an actual output voltage. The voltage divider means preferably is provided by a pair of resistors connected to the voltage reference means.

According to another aspect of the invention, the dc-to-dc converter preferably includes external connections or pins permitting access to the output of the reference voltage means and the node between the pair of resistors. Accordingly, external control of the output voltage may be achieved, such as to permit a microprocessor to select its own enhanced operating voltage.

A method aspect of the present invention is for operating the dc-to-dc converter to have a regulated output voltage. The dc-to-dc converter preferably comprises a plurality of output transistors connected in parallel, and a reference voltage generator for generating a first reference voltage signal greater than the output voltage. The method preferably comprises the steps of: dividing the first reference voltage from the reference voltage generator to generate a second reference voltage lower than a desired output voltage, generating an error signal based upon a difference between the second reference voltage and an actual output voltage, and operating the plurality of output transistors to produce the output voltage based upon the error signal.

The method also preferably further includes the steps of: generating a desired output voltage signal for the dc-to-dc converter, and selecting the output voltage of the dc-to-dc converter by over-driving a node of the voltage divider based upon the desired output voltage signal and the first reference voltage. The step of generating a desired output voltage signal preferably comprises generating a desired output voltage signal in digital form. Accordingly, the method preferably further comprises the steps of converting the desired output voltage signal in digital form to an analog signal, and scaling the analog voltage signal based upon the first reference voltage to thereby generate a scaled analog signal for over-driving the node of the voltage divider.

The method may be readily applied to an electronic device having an operating voltage for providing enhanced performance and including means for generating an enhanced performance voltage signal. The electronic device is preferably a microprocessor or memory device which produces the enhanced performance voltage signal in digital form.

BRIEF OF THE DRAWINGS

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
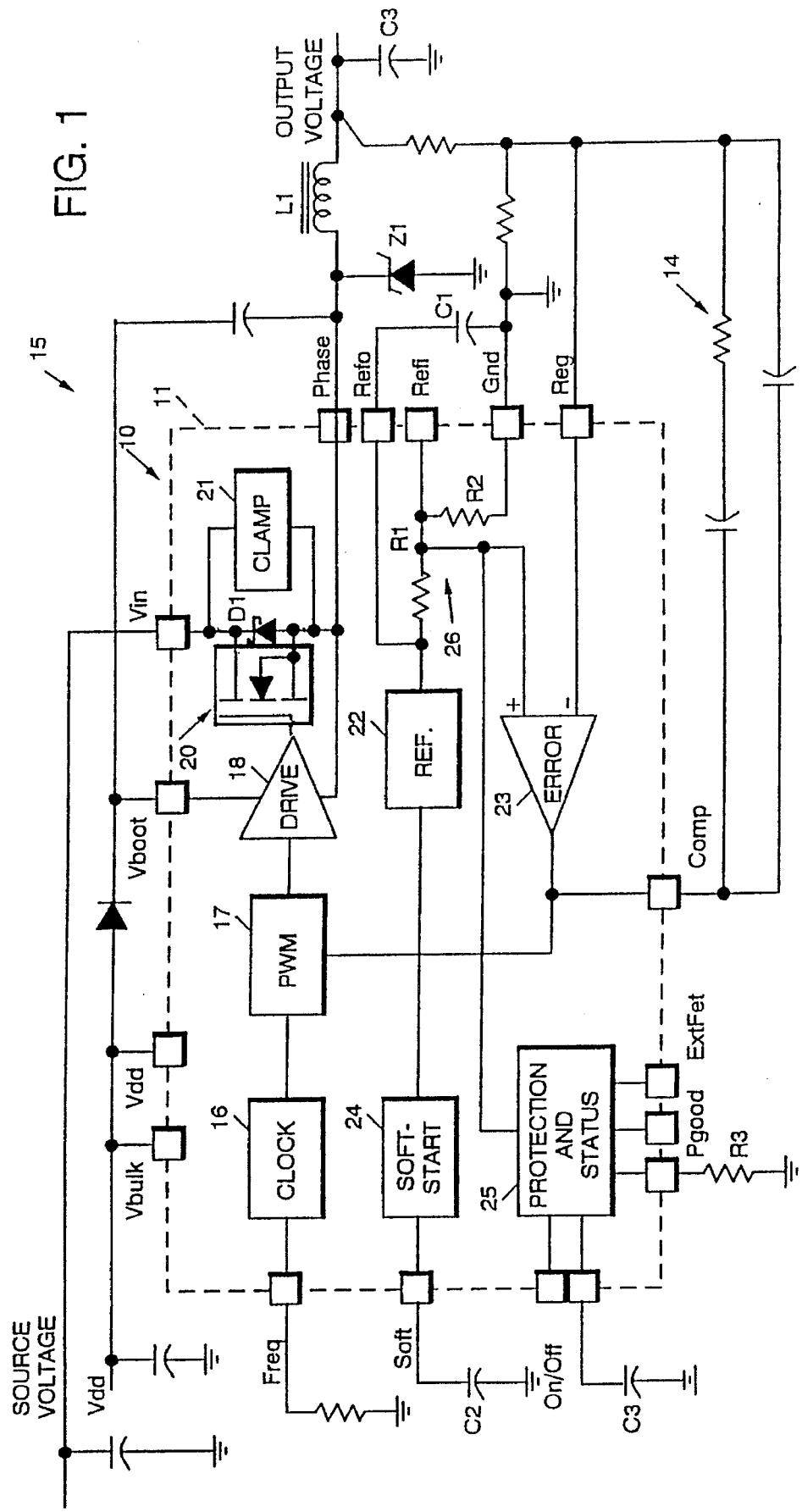
FIG. 1 is a schematic block diagram of the dc-to-dc power converter according to the present invention.

Referring now initially to FIG. 1, an embodiment of the step down dc-to-dc power converter 10 in integrated circuit form according to the invention is first described. The dc-to-dc converter 10 includes a die or substrate 11 upon which the various control and power output devices are formed, as would be readily understood by those skilled in the art. The dc-to-dc converter 10 is a step down power converter which produces a relatively low output voltage, and high output current from a source voltage. For example, the output voltage is preferably in the range of about 2 to 4 volts, and, more preferably about 2.9 volts for a source voltage of about 12 volts. The control operating voltage Vdd is preferably about 12 volts. A Schottky output diode D1 and inductor L1 are connected to the phase output as would be readily understood by those skilled in the art. As illustrated, other components may be connected to the pins or contact pads of the integrated circuit to define the overall dc-to-dc converter circuit 15 including the capacitors and resistor of the compensation feedback circuit 14, as would be readily understood by those skilled in the art.

The dc-to-dc converter 10 includes the following functional blocks; a clock 16, a pulse width modulator 17, a gate driver 18, output power transistors 20, a clamp 21 for the output power transistors, a reference voltage 22, and an error amplifier 23. The plurality of output transistors are schematically illustrated by the block labeled 20 and are hearafter referred to as output transistors 20 for simplicity. In addition, soft-start 24 and protection/status features 25 are provided.

The dc-to-dc converter 10 includes a precision band gap voltage reference 22 which is preferably trimmed for both initial accuracy and temperature drift to produce a desired first reference voltage greater than the output voltage of the dc-to-dc converter. For example, for a 3.1 volt output, the first reference voltage may be 5.1 volts. This first reference voltage is then divided down by the voltage divider 26 provided by the series connected pair of resistors R1, R2 to produce a second reference voltage which is input to the error amplifier 23. The two nodes defined by the voltage divider are made accessible to the user via pins labelled Refo, Refi in the illustrated embodiment.

The first reference voltage is preferably brought to pin Refo to allow for external decoupling by capacitor C1. This provides better AC performance for the band gap reference. The tap or node between the pair of resistors R1, R2 is also brought out to pin Refi to allow the user to overdrive the resistor divider 26 with an external reference, as described in greater detail below.

Figure 2:
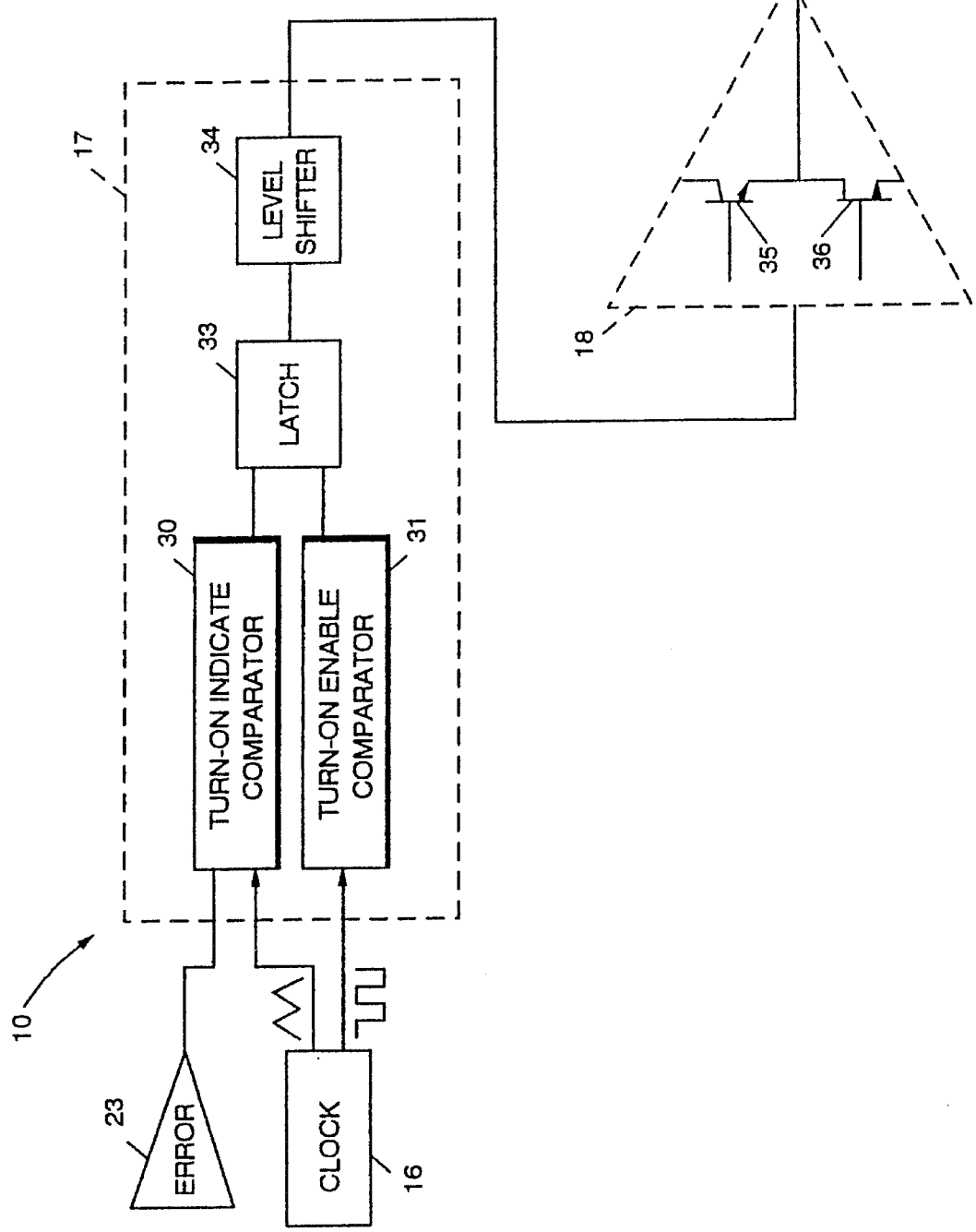
FIG. 2 is a schematic block diagram of portion of the dc-to-dc power converter as shown in FIG. 1.

Referring now additionally to FIG. 2, operation of the dc-to-dc converter 10 is described in greater detail. The clock 16 generates triangle and square wave signals at the same frequency and which are in phase such that the falling edge of the triangle wave corresponds to low half-cycle of the square wave. The error voltage from the output of the error amplifier 23 and the two signals generated by the clock are used to control the pulse width modulation circuit 17.

In particular, a first comparator 30 monitors the error voltage and the triangle wave to generate a turn-on indication whenever the triangle wave is below the error voltage from the error amplifier 23. The square wave signal generated by the clock 16 is passed through a second comparator 31 in order to match delays of the turn-on indication signal and thereby generate a turn-on enable signal. Both the turn-on indication and the turn-on enable are input to the latch 33. The turn-on indication is used to set the latch 33 and generate the turn-on command. The turn-on enable signal gates the turn-on indication signal into the latch 33 to ensure that the power output transistors 20 only turn on during the falling edge of the triangle wave, and only turn off during the rising edge of the triangle wave. This prevents erroneous control of the output caused by chatter of the first comparator 30 at its switching point.

The turn-on command from the latch 33 is input to a ground referenced level shifter 34. The level shifter 34 preferably employs high voltage n-channel devices to communicate between the low voltage control circuitry referenced to Vdd and the floating gate drive circuitry referenced to Vboot as would be readily understood by those skilled in the art. The rising and falling edges of the turn-on command are converted into turn-on and turn-off current pulses which are sent through the high voltage n-channel devices to the floating pulse receiver section of the level shifter. The receiver makes a differential comparison of the on and off current to generate on and off commands for the floating level shifter latch. The differential current comparison is important to reject the transient currents which may occur under turn-on and turn-off of the output power transistor 20. The pulsed nature of the level shifter is used to minimize power dissipation, since any current command during the on-time will dissipate power based on the input control voltage plus the input power bus voltage.

The output of the level shifter 34 is input to the gate driver 18 which drives the gate of the output power transistors 20. The output stage of the gate driver 18 is preferably a totem pole configuration with n-type transistors used to effect both the pull-up and pull-down of the gate of the n-channel power transistors. The input to the gate driver 18 is conditioned via parallel paths which are appropriately timed to create drive signals to the output devices of the gate driver 18 which are non-overlapping to reduce shoot-through current in the gate driver. The output of the gate driver 18 preferably employs a bipolar npn transistor 35 for the output pull-up device and an n-channel MOSFET 36 for the output pull-down device. In general, the bipolar transistor 35 is capable of much higher current density which reduces the required die area.

The use of a bipolar transistor for the pull-down device is undesirable for two reasons. If a bipolar transistor were used, the output would only pull-down to the $V_{CE}$ saturation of the transistor. And secondly, when the output power transistors 20 are turned off, the source/output node would transition below ground due to the current flowing in the output inductor L1. This node is traditionally clamped with a Schottky diode or synchronous switch to prevent it from going more than a diode below ground. However, current flowing in the bondwires of the integrated circuit may force the output node at the die of the integrated circuit several volts below ground due to the parasitic inductance of the bondwires.

In addition, if a bipolar transistor were used to turn-off the gate of the power output transistors, the following may also occur. When the output/source of the power output transistors were pulled below ground (which is the p-type substrate of the IC) the emitter of the gate driver would also be pulled below ground. Since the npn bipolar transistor would then be saturated to turn off the power output transistors 20, the collector would also try to pull below ground. When the collector fell a diode below ground, it would be clamped by the diode formed by the usually reverse biased substrate. The emitter of the gate driver bipolar transistor would continue to drive negative which would turn on the power output transistors resulting in high power loss. Accordingly, the pull-down device in the gate driver 18 of the dc-to-dc converter 10 of the present invention is an NMOS transistor 36 rather than a bipolar transistor.

For a low voltage dc-to-dc converter, the on resistance of the output device or power output transistors is important in determining the available output current and efficiency. To reduce cost the power output device should have a relatively low specific on resistance per area and a relatively low threshold voltage. Fortunately in the class of low voltage converters, large blocking voltages for the power device are not typically required. These requirements allow the use of power NMOS technology as opposed to the traditional use of n-channel DMOS devices as in the 45 V/14A BUCK Power IC made by the assignee of the present invention. The power NMOS device of the present invention is preferably in the form of a plurality of the NMOS FETs connected in parallel and collectively defining a gate, a drain, and a source. For example, for the illustrated embodiment, about 650,000 NMOS transistors are formed and connected together on the IC die. The NMOS transistors deliver relatively low power device on resistance (about 25 m$\Omega$) and significantly reduce the required die size.

One common drawback of the power NMOS device is its low drain to source breakdown voltage and low avalanche energy capability. This drawback can be overcome with the addition of active circuitry to limit the drain to source voltage during transient overvoltage conditions. This transient condition may again be caused by the parasitic bondwires and board layout in the converter 10. The dc-to-dc converter 10 of the present invention employs a clamp 21 which is inactive under normal conditions, and clamps the drain to source voltage to a predetermined voltage under transient conditions. For example, the clamp 21 may limit the source to drain voltage to about 17 volts for the illustrated embodiment. In addition, the clamp 21 may include zener diodes and a Darlington output stage, as would be readily understood by those skilled in the art.

Referring again more particularly to FIG. 1, the soft-start and protection/status features of the dc-to-dc converter 10 are described in greater detail. The soft-start circuit 24 works in conjunction with an external capacitor C2 and the voltage reference 22 and the error amplifier 23 to allow the output voltage to slowly ramp to its final value at start-up. This is desirable to prevent excessive output current when charging the output capacitance C3 of the dc-to-dc converter 10.

The protection circuitry 25 preferably includes overvoltage, under-voltage, over-current, and over-temperature protection. The over-voltage function uses a comparator to monitor the output voltage and the reference voltage Refi. By monitoring Refi instead of Refo if the internal reference is over-driven by an external source to set the output voltage, the overvoltage protection function will track accordingly. The under-voltage circuit monitors the Vdd and Vbulk power inputs. It prevents operation of the dc-to-dc converter 10 until sufficient control voltage exists.

The over current function uses an external resistor R3, external capacitor C3, and internal circuitry to detect over current conditions. The over-current threshold is set by the external resistor to be preferably in the range of about 5 to 15 amps for the illustrated embodiment. Each time the output power transistor 20 is turned on, the output current is compared to a reference current. If the output current exceeds the reference current, the external capacitor C3 is charged by an internal current source which acts as an overcurrent delay to prevent nuisance trips. When the voltage on capacitor C3 exceeds a predetermined threshold, an overcurrent fault shuts down the dc-to-dc converter 10.

An on-chip temperature sensing circuit is used to monitor the temperature of the substrate 11 as would be readily understood by those skilled in the art. The over-voltage, over-current and over-temperature faults are all latched when they occur and result in the dc-to-dc converter 10 shutting down. If the dc-to-dc converter 10 shuts down due to any of these faults, the Pgood status output will be pulled low. This status output is also used at start-up to indicate the soft-start period is over and the supply is regulating at the desired output voltage. A signal is produced at the ExtFet pin to control an external FET and thereby provide fail-safe operation, as is known to those skilled in the art.

Figure 3:
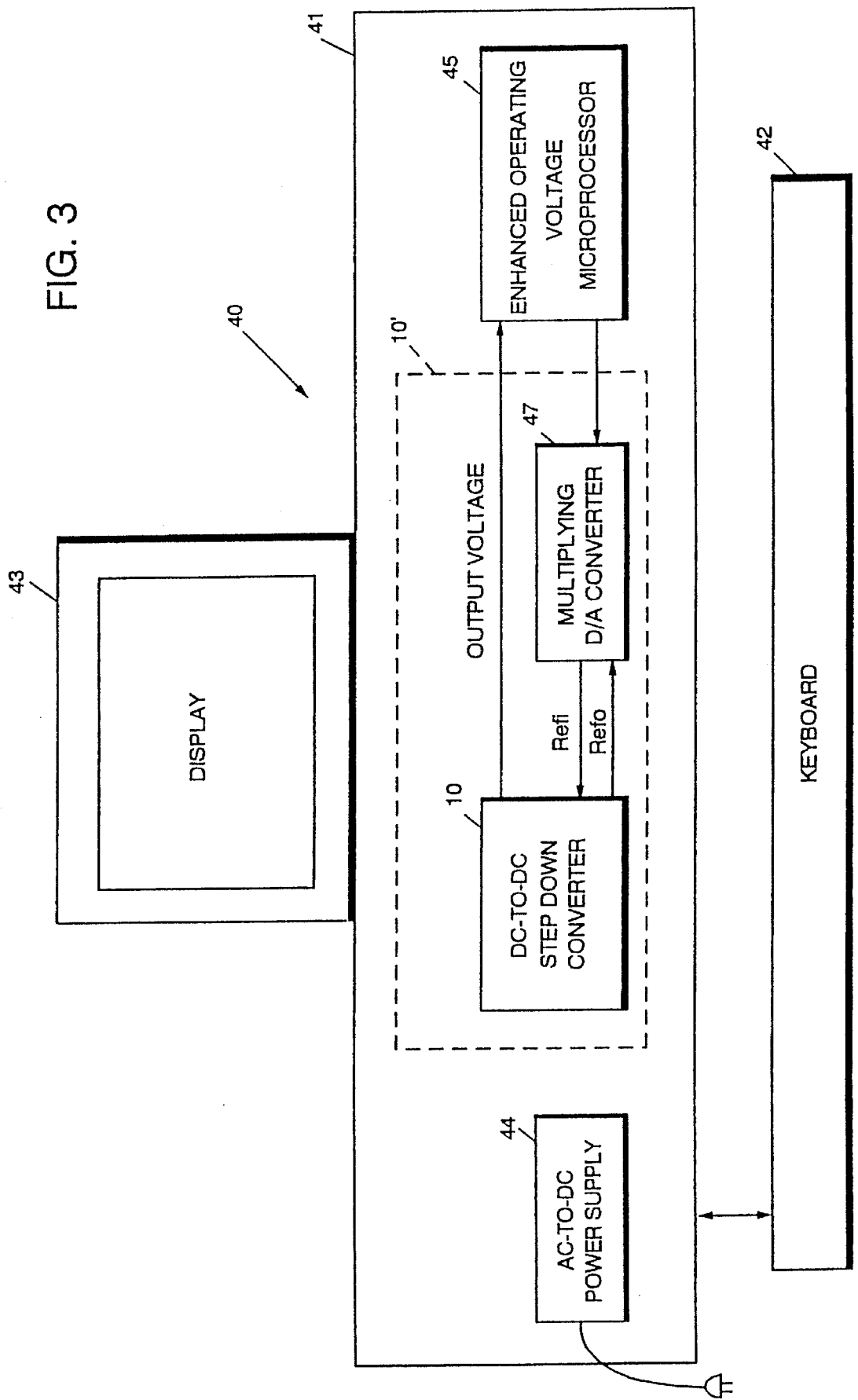
FIG. 3 is a schematic block diagram of the dc-to-dc converter included in a personal computer according to the invention.

Referring now additionally to FIG. 3, a personal computer 40 is illustrated to further explain voltage output selection using the Refi and Refo pins of the dc-to-dc converter 10. The personal computer includes a housing 41 containing the electronic components, a keyboard 42 or other input device, and a display 43 or other output device, as would be readily understood by those skilled in the art. In particular, an ac-to-dc power converter 44 provides the required dc voltage inputs to the dc-to-dc converter 10. The output of the dc-to-dc converter 10 is connected to a microprocessor 45 having an enhanced operating voltage, and including means for generating an enhanced performance voltage signal, preferably in digital form.

As would be readily understood by those skilled in the art, microprocessors 45 may be screened device-by-device to obtain an optimum performance/speed based on the operating voltage. In other words, a microprocessor or memory device, for example, may have an operating voltage for providing enhanced performance. Accordingly, the output voltage of the dc-to-dc converter 10 is selected to produce enhanced performance of the microprocessor.

The enhanced performance voltage signal in the form of a digital word is illustratively passed through a multiplying digital-to-analog converter (DAC) 47 and which uses the first reference voltage from the voltage reference 22 available at the Refo pin. The output of the DAC 47 may be the desired operating voltage which, in turn, is used to over-drive the voltage divider 26 through the Refi pin. In addition, the multiplying DAC and dc-to-dc converter components may be readily combined on the integrated circuit die as schematically illustrated by the dashed block labelled 10'. As would also be readily understood by those skilled in the art, other voltage sensitive devices, such as memory devices, may also be advantageously used with the dc-to-dc converter 10 and multiplying DAC 47 configuration illustrated.

A first method aspect of the present invention is for operating a dc-to-dc converter 10 as described above to have a regulated output voltage. The dc-to-dc converter 10 comprises a plurality of output transistors 20 connected in parallel, and a reference voltage generator 22 for generating a first reference voltage signal greater than the output voltage. The method preferably comprises the steps of: dividing the first reference voltage from the reference voltage generator 22 to generate a second reference voltage lower than a desired output voltage; generating an error signal based upon a difference between the second reference voltage and an actual output voltage; and operating the plurality of output transistors 20 to produce the output voltage based upon the error signal.

The method preferably further includes the steps of: generating a desired output voltage signal for the dc-to-dc converter 10, and selecting the output voltage of the dc-to-dc converter by over-driving a node of a voltage divider 26 based upon the desired output voltage signal and the first reference voltage.

The step of generating a desired output voltage signal preferably comprises the step of generating a desired output voltage signal in digital form. Accordingly, the method preferably further comprises the steps of: converting the desired output voltage signal in digital form to an analog signal, and scaling the analog voltage signal based upon the first reference voltage to thereby generate a scaled analog signal for over-driving the node of the voltage divider.

Another method aspect of the present invention is for powering an electronic device with a dc-to-dc converter 10, wherein the electronic device has an operating voltage for providing enhanced performance and comprises means for generating an enhanced performance voltage signal. The dc-to-dc converter 10 preferably comprises a plurality of output transistors 20 connected in parallel, and a reference voltage generator for generating a first reference voltage signal greater than the output voltage. The method preferably comprising the steps of: dividing the first reference voltage from the reference voltage generator to generate a second reference voltage lower than a desired output voltage, generating an error signal based upon a difference between the second reference voltage and an actual output voltage, operating the plurality of output transistors 20 to produce the output voltage based upon the error signal, and selecting the output voltage of the dc-to-dc converter 10 to be the operating voltage for providing enhanced performance by over-driving a node of the voltage divider based upon the enhanced performance voltage signal and the first reference voltage.

The enhanced performance voltage signal is preferably in digital form, and the method further preferably comprises the steps of: converting the desired output voltage signal in digital form to an analog signal, and scaling the analog voltage signal based upon the first reference voltage to thereby generate a scaled analog signal for over-driving the node of the voltage divider 26.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An integrated circuit dc-to-dc step down power converter comprising:

a substrate;

output means on said substrate for generating an output voltage from a source voltage, said output means comprising a plurality of first metal oxide semiconductor field effect transistors (MOSFETs) connected in parallel and collectively defining a gate, a source and a drain, each of said plurality of first MOSFETs comprises an n-channel enhancement-type MOSFET;

control means on said substrate for controlling said output means to produce a desired output voltage therefrom; and driver means on said substrate and connected between said control means and said output means for operating said output means responsive to said control means, said driver means comprising a bipolar transistor connected to said gate for turning on said plurality of first MOSFETs, and a second MOSFET connected to said gate for turning off said plurality of first MOSFETs.

2. A dc-to-dc converter according to claim 1 further comprising clamp means connected across the drain and source of said plurality of first MOSFETs for clamping a drain to source voltage within a predetermined range during a transient voltage condition.

3. A dc-to-dc converter according to claim 1 wherein said bipolar transistor is an npn bipolar transistor, and wherein said second MOSFET is an n-channel MOSFET.

4. A dc-to-dc converter according to claim 1 wherein said control means further comprises:

reference voltage means for generating a first reference voltage greater than the output voltage;

voltage divider means connected to said reference voltage means for dividing the first reference voltage to generate a second reference voltage lower than a desired output voltage; and error determining means connected to said voltage divider means for generating an error signal based upon a difference between the second reference voltage and an actual output voltage.

5. A dc-to-dc converter according to claim 4 wherein said control means further comprises output voltage selecting means connected to said reference voltage means and said voltage divider means for permitting selecting of the output voltage based upon a desired output voltage signal.

6. A dc-to-dc converter according to claim 5 wherein said output voltage selecting means comprises a multiplying digital-to-analog converter.

7. A dc-to-dc converter according to claim 6 wherein said multiplying digital-to-analog converter comprises:

digital input means for receiving the desired output voltage signal in digital form;

converter means for converting the desired output voltage signal in digital form to an analog signal; and multiplying means connected to said reference voltage means for scaling the analog signal from said converter means based upon the first reference voltage to thereby generate a scaled analog signal connected to said voltage divider means.

8. A dc-to-dc converter according to claim 4 wherein said voltage divider comprises a pair of resistors connected to said voltage reference means, and further comprising access means for externally accessing both the reference voltage means and a node between the pair of resistors to thereby permit external selection of the output voltage.

9. A dc-to-dc converter according to claim 4 wherein said control means further comprises:

a clock for producing a predetermined frequency; and pulse width modulating means connected to said clock and said driver means for operating said driver means.

10. A dc-to-dc converter according to claim 1 wherein said bipolar transistor and said second MOSFET are connected together in a totem pole configuration.

11. A dc-to-dc converter according to claim 1 further comprising soft-start means for progressively increasing the reference voltage at start-up.

12. A dc-to-dc converter according to claim 1 further comprising protection means for turning off the output means responsive to one of over-voltage, under voltage, over-current, and over-temperature.

13. A dc-to-dc converter according to claim 12 further comprising status indicator means for indicating whether said protection means has turned off the output means.

14. An integrated circuit dc-to-dc converter comprising:

a substrate;

output means on said substrate for generating an output voltage from a source voltage, said output means comprising a plurality of first transistors connected in parallel;

control means on said substrate for controlling said output means to produce a desired output voltage therefrom, said control means comprising reference voltage means for generating a first reference voltage greater than the desired output voltage, voltage divider means connected to said reference voltage means for dividing the first reference voltage to generate a second reference voltage lower than the desired output voltage, error determining means connected to said voltage divider means for generating an error signal based upon a difference between the second reference voltage and an actual output voltage, and access means for permitting selective external driving of said voltage divider means to permit changing the second reference voltage from that which would otherwise be generated by dividing the first reference voltage alone and thereby permit selection of the desired output voltage.

15. A dc-to-dc converter according to claim 14 wherein said control means further comprises output voltage selecting means connected to said access means for permitting selecting of the output voltage based upon a desired output voltage signal.

16. A dc-to-dc converter according to claim 15 wherein said output voltage selecting means comprises a multiplying digital-to-analog converter.

17. A dc-to-dc converter according to claim 16 wherein said multiplying digital-to-analog converter comprises:

digital input means for receiving the desired output voltage signal in digital form;

converter means for converting the desired output voltage signal in digital form to an analog signal; and multiplying means connected to said reference voltage means for scaling the analog signal from said converter means based upon the first reference voltage to thereby generate a scaled analog signal connected to said voltage divider means.

18. A dc-to-dc converter according to claim 14 wherein said voltage divider means comprises a pair of resistors connected to said voltage reference means, and wherein said access means comprises means for permitting external access to said reference voltage means and a node between the pair of resistors.

19. A dc-to-dc converter according to claim 14 wherein said plurality of first transistors comprises a plurality of first n-channel enhancement-type metal oxide semiconductor field effect transistors (MOSFETs) collectively defining a gate, a source and a drain; and further comprising driver means on said substrate and connected between said control means and said output means for operating said output means responsive to said control means; said driver means comprising an npn bipolar transistor connected to said gate for turning on said plurality of first MOSFETs, and a second n-channel MOSFET connected to said gate for turning off said plurality of first MOSFETs.

20. A dc-to-dc converter according to claim 19 further comprising clamp means connected across the drain and source of said plurality of first MOSFETs for clamping a drain to source voltage within a predetermined range during a transient voltage condition.

21. A dc-to-dc converter according to claim 14 wherein said control means further comprises:

a clock for producing a predetermined frequency; and pulse width modulating means connected to said clock and said driver means for operating said driver means.

22. An electronic circuit comprising:

an electronic device having an operating voltage for providing enhanced performance and comprising means for generating an enhanced performance voltage signal; and a dc-to-dc converter connected to said electronic device for supplying as an output voltage the operating voltage for providing enhanced performance for said electronic device and based upon the enhanced performance voltage signal, said dc-to-dc converter comprising output means for generating the output voltage from a source voltage, said output means comprising a plurality of first transistors connected in parallel, and control means for controlling said output means to produce the output voltage therefrom, said control means comprising reference voltage means for generating a first, reference voltage greater than the output voltage, voltage divider means connected to said reference voltage means for dividing the first reference voltage to generate a second reference voltage lower than a desired output voltage, error determining means connected to said voltage divider means for generating an error signal based upon a difference between the second reference voltage and an actual output voltage, and output voltage selecting means connected to said voltage divider means for selectively driving said voltage divider means based upon the enhanced performance voltage signal from said electronic device so that the output voltage is the operating voltage for providing enhanced performance for said electronic device.

23. An electronic circuit according to claim 22 wherein said output voltage selecting means comprises a multiplying digital-to-analog converter.

24. An electronic circuit according to claim 23 wherein said multiplying digital-to-analog converter comprises: digital input means for receiving the enhanced performance voltage signal in digital form;

converter means for converting the enhanced performance voltage signal in digital form to an analog signal; and multiplying means connected to said reference voltage means for scaling the analog signal from said converter means based upon the first reference voltage to thereby generate a scaled analog signal connected to said voltage divider means.

25. An electronic circuit according to claim 22 wherein said voltage divider means comprises a pair of resistors connected to said voltage reference means, and further comprising access means for connecting said output voltage selecting means to said reference voltage means and a node between the pair of resistors to thereby permit external selection of the output voltage.

26. An electronic circuit according to claim 22 wherein said plurality of first transistors comprise a plurality of first n-channel enhancement-type metal oxide semiconductor field effect transistors (MOSFETs) collectively defining a gate, a source and a drain; and further comprising driver means on said substrate and connected between said control means and said output means for operating said output means responsive to said control means; said driver means comprising an npn bipolar transistor connected to said gate for turning on said plurality of first MOSFETs, and a second n-channel MOSFET connected to said gate for turning off said plurality of first MOSFETs.

27. An electronic circuit according to claim 26 further comprising clamp means connected across the drain and source of said plurality of first MOSFETs for clamping a drain to source voltage within a predetermined range during a transient voltage condition.

28. An electronic circuit according to claim 22 wherein said control means further comprises:

a clock for producing a predetermined frequency; and pulse width modulating means connected to said clock and said driver means for operating said driver means.

29. An electronic circuit according to claim 22 wherein said electronic device is one of a microprocessor or a memory device.

30. A method for operating a dc-to-dc converter to have a regulated output voltage, the dc-to-dc converter comprising a plurality of output transistors connected in parallel; and a reference voltage generator for generating a first reference voltage greater than the output voltage, the method comprising the steps of:

dividing the first reference voltage from the reference voltage generator using a voltage divider to generate a second reference voltage lower than a desired output voltage;

generating an error signal based upon a difference between the second reference voltage and an actual output voltage;

operating the plurality of output transistors to produce the output voltage based upon the error signal; and permitting selective driving of the voltage divider to permit changing the second reference voltage from that which would otherwise be generated by dividing the first reference voltage alone and thereby permitting selection of the desired output voltage.

31. A method according to claim 30 further comprising the step of:

generating a desired output voltage signal for the dc-to-dc converter; and selecting the output voltage of the dc-to-dc converter by over-driving a node of the voltage divider based upon the desired output voltage signal and the first reference voltage.

32. A method according to claim 31 wherein the step of generating a desired output voltage signal comprises the step of generating a desired output voltage signal in digital form; and further comprising the steps of:

converting the desired output voltage signal in digital form to an analog signal; and scaling the analog voltage signal based upon the first reference voltage to thereby generate a scaled analog signal for over-driving the node of the voltage divider.

33. A method for powering an electronic device with a dc-to-dc converter, the electronic device having an operating voltage for providing enhanced performance and comprising means for generating an enhanced performance voltage signal, the dc-to-dc converter comprising a plurality of output transistors connected in parallel, and a reference voltage generator for generating a first reference voltage signal greater than the output voltage, the method comprising the steps of:

dividing the first reference voltage from the reference voltage generator using a voltage divider to generate a second reference voltage lower than a desired output voltage;

generating an error signal based upon a difference between the second reference voltage and an actual output voltage operating the plurality of output transistors to produce the output voltage based upon the error signal; and selecting the output voltage of the dc-to-dc converter to be the operating voltage for providing enhanced performance by selectively driving the voltage divider based upon the enhanced performance voltage signal from the electronic device.

34. A method according to claim 33 wherein the enhanced performance voltage signal is in digital form, and further comprising the steps of:

converting the desired output voltage signal in digital form to an analog signal; and scaling the analog voltage signal based upon the first reference voltage to thereby generate a scaled analog signal for over-driving a node of a voltage divider connected to the reference voltage.

* * * * *